Sept. 4, 1956 J. J. DREZNES 2,761,527
FILTER BODY

Original Filed Jan. 29, 1949 2 Sheets-Sheet 1

Inventor
John J. Dreznes
by Parker & Carter
Attorneys

Sept. 4, 1956 J. J. DREZNES 2,761,527
FILTER BODY
Original Filed Jan. 29, 1949 2 Sheets-Sheet 2
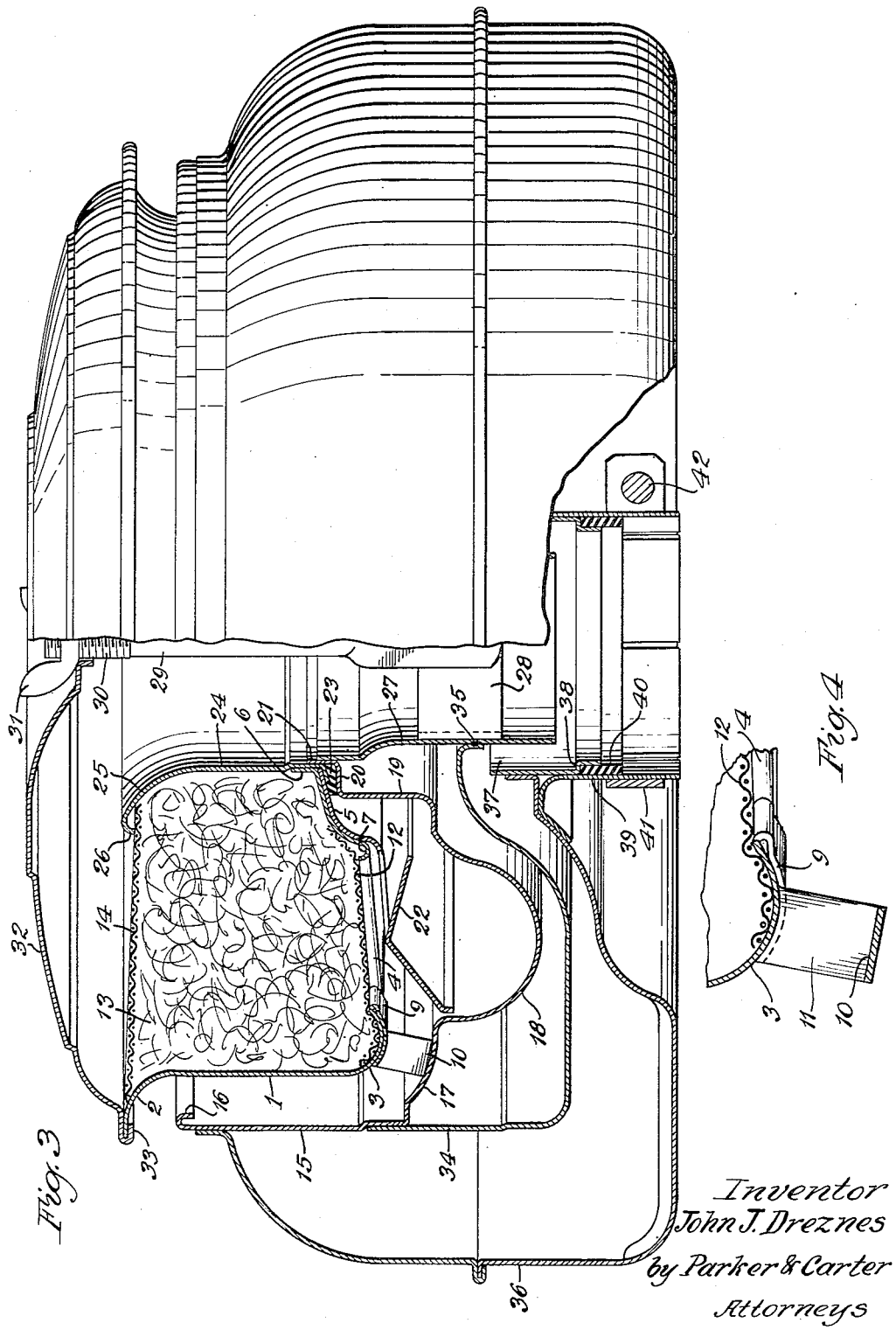
Inventor
John J. Dreznes
by Parker & Carter
Attorneys

United States Patent Office 2,761,527
Patented Sept. 4, 1956

2,761,527
FILTER BODY

John J. Dreznes, Chicago, Ill., assignor to United Specialties Company, Chicago, Ill., a corporation of Delaware Original application January 29, 1949, Serial No. 73,594, now Patent No. 2,641,826, dated June 16, 1953. Divided and this application May 5, 1953, Serial No. 353,149

2 Claims. (Cl. 183—44)

This invention relates to an air cleaner or dust separator and in its present form is particularly directed to the filter body or housing which encloses the filter unit in such an air cleaner.

It has for one object to provide a filter body housing or container.

Another object is to provide a filter body intended to be positioned in a cleaner assembly and to provide, as a part of the body spacing means to insure proper spacing of the filter body within the total air cleaner assembly.

Other objects will appear from time to time in the course of the specification.

This invention is illustrated more or less diagrammatically in the accompanying drawings wherein:

Figure 3 is a side elevation with parts in section illustrating a complete cleaner with the device of the present invention in place therein.

Figure 4 is a sectional view taken at line 4, 4 of Figure 2 on an enlarged scale.

Like parts are indicated by like numbers throughout the specification and drawings.

Figure 1:
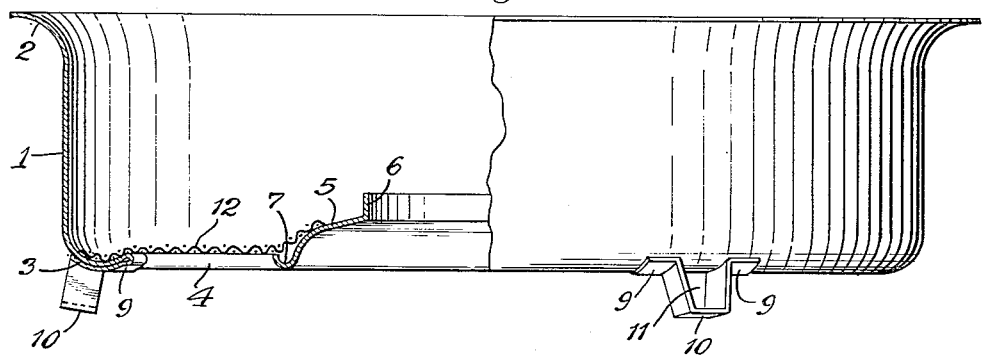
Figure 1 is a section through one form of the housing or container for the filter body.
Figure 2:
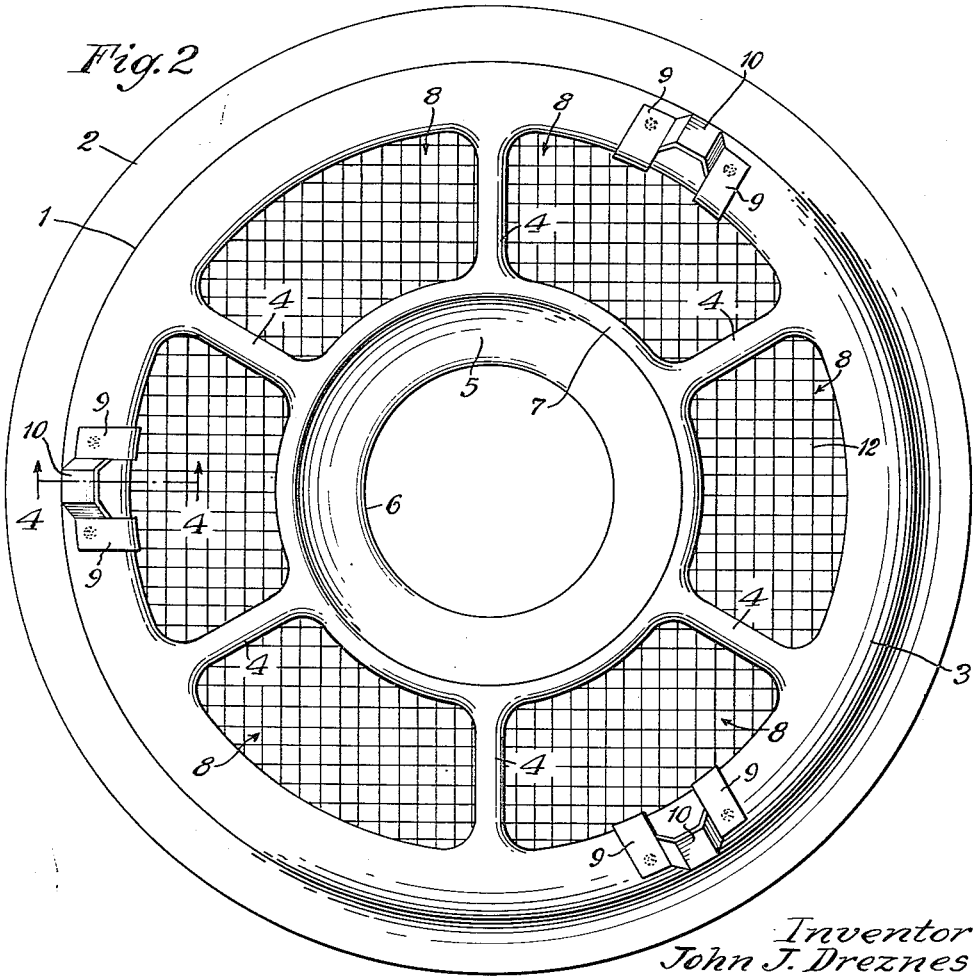
Figure 2 is a bottom plan view of the housing member shown in Figure 1.

The housing or container for the filter mass which together with the filter mass comprises the filter body is shown in its completed form in Figs. 1 and 2 and assembled with the total cleaner in Fig. 3. This housing comprises a member having an annular wall 1 and an outwardly bent or curved upper flange 2. The wall 1 is integral at its lower end with a curved portion 3 which is connected by arms 4 to a central ring-like portion 5 which terminates in an upwardly projecting annular portion 6. The member 5 is upturned at its outer edges to provide a trough-like portion 7 and the arms 4, as shown in Fig. 1 particularly, are provided with upturned edges so that their lower surfaces are round. The arms 4 are formed by severing parts of the blank from which the housing is made. This severing operation produces openings or spaces 8 between the arms 4.

When the severing or shearing operation to form the spaces 8 is carried out, three or more members are allowed to remain to form legs which support and space the housing. Each of these legs comprises a pair of side portions 9 which are integral with the blank and which are joined by an integral central portion 10. The portion 10 joins the members 9. When the leg is in the finished position, as shown in Fig. 1 particularly, an opening or space 11 is formed within the leg and the leg thus presents a minimum of resistance to flow past or through it. The leg is preferably made of thin material to present a minimum of resistance to the flow of fluid.

After the shell has been made with the legs in place, a section of wire screen or other perforate material is laid in position, as shown particularly in Fig. 1, and this screen section 12 spans the openings 8 and overlies the feet portions 9 and 10. After the screen section is in place it may be welded to the housing, and at the same welding operation the portions 9 may be welded to the outer surface of the housing. Thus at a single welding operation the screen may be welded in place and the feet portions 9 also welded in place. The welding or other fastening steps are not essential. Since the legs formed by the parts 9 and 10 will usually be integral with the shell 2, they may merely be shaped properly without being welded or otherwise additionally secured in place, and the screen may merely be laid into place, if desired. Thus the foot construction may be formed integrally with the housing.

With the filter body housing formed, as shown in Fig. 1, it is then filled with a mass of filter material 13, and, if desired, a member 14 which may be formed of wire mesh or other perforate material is placed on top of the filter mass 13.

The filter body is assembled with a cleaner. The cleaner comprises, as shown in Fig. 3, a housing member 15 which is provided with a downwardly and inwardly turned lip 16 at its upper edge. The housing is closed at its bottom by a cup portion which includes the relatively flat curved part 17 and the deeper and more sharply curved portion 18. A tubular portion 19 is integral with the portion 18 and is also integral with a shoulder 20 and an upwardly extending tubular portion 21. A baffle 22 is positioned on the shoulder 20 and a gasket 23 seals the members. The filter body is positioned above the baffle 22 and the center of the filter body is defined by an air passage member 24 which is outwardly flared at 25 and terminates in a downwardly bent lip portion 26. A tubular member 27 is secured to the tubular portion 21 and contains a spider 28 within which a retaining member 29 is fixed. This member is threaded at its upper end at 30 to receive a thumb nut 31. A cover plate 32 comprises the top of the cleaner and is fixed to the filter body housing portion by being downwardly bent, as at 33, about the outer edge of the flared portion 2 of the housing 1.

Fixed to the cup member 15 is a second cup 34 which is also fixed at its inner edge, as at 35, to the tubular member 27. A resonator 36 may be positioned about a substantial portion of the cleaner assembly and is fixed at its inner edge to a tubular member 37 which is shaped to provide a shoulder 38. A second tubular member 39 is also fixed to the resonator and a packing member 40 is positioned against the shoulder 38 between the members 37 and 39. A clamping ring 41 is positioned about the member 39 and is provided with a tightening and attaching screw 42 by means of which the cleaner is removably and adjustably fixed in place upon a carburetor intake or at any other place where a cleaner of this type is to be used.

The filter body shown and described herewith is not limited in its use to the particular association shown. It might be used with many types of cleaners. It is intended for use with a cleaner which includes a cup portion and the feet provide accurate and positive spacing of the filter body within the cup portion. The filter body 1 and the cup portion 15 form an annular inlet passage and it is important that that passage be uniform and that the filter body be accurately and positively spaced within the cleaner. It is also important to interrupt the flow of air or fluid as little as possible. The legs however made present a minimum resistance and interruption to the flow of air past them. As shown particularly in Fig. 1, the legs are open and only the thin section of the legs is presented to the inflowing air and thus a minimum of resistance and disturbance is caused by the legs.

While it is economical to form legs of the type shown as described above and as a part of the method of formation of the housing, obviously instead of forming these U-shaped legs integrally with the housing, they might be separately formed. Thus a U-shaped clip or leg, similar in shape and size to that shown in the drawings, might be formed separately and welded or otherwise secured to the housing 1 in the position in which the legs 9, 10 are shown. A leg of sharp formation or other thin section may be used and the leg need not be of U- or V-shape.

Whatever the exact contour of the legs and whatever the exact method of forming or attaching them may be, they are so arranged that they have sufficient structural strength to form a positive stopping and spacing means to insure the proper positioning of the filter body with relation to the cleaner housing. Also, the legs are so shaped that they present a minimum of resistance to the flow of air entering the cleaner. The air flowing through the air gap between the housings 1 and 15 passes generally parallel to the width of the leg. The leg is preferably positioned to lie generally radially of the shell.

Although I have shown an operative form of my invention, it will be recognized that many changes in the form, shape and arrangement of parts can be made without departing from the spirit of the invention, and my showing is therefore to be taken as, in a sense, diagrammatic. Although the shell 1 and the spider portion 4 are shown as shaped integrally, it is to be understood that the spider might be formed of a separate piece positioned with or secured to the shell 1, and the invention is not limited, therefor, to a structure in which the shell 1 and the portions 3, 4, 5, 6 and 7 are all integral with each other.

This is a division of my application, Serial No. 73,594, filed January 29, 1949, now Patent 2,641,826, issued June 16, 1953.

I claim:

1. In an air cleaner for use with an internal combustion engine or the like, a cleaner housing, a filter housing within the cleaner housing having a cup-shaped configuration, a filter medium within the filter housing, a plurality of openings in the bottom of the filter housing arranged generally in a circle and providing communication with the filter medium for dirty air, and a means for spacing the filter housing with respect to the cleaner housing so as to provide an annular passage for dirty air, including a plurality of legs fixed to the filter housing, each leg being positioned adjacent an opening in the bottom of the filter housing, each leg including two spaced, generally radially disposed side portions generally flush with the bottom of the filter housing and a projecting portion between them formed integrally with each side portion and engaging the cleaner housing at its outer end, each of the side portions being connected at its inner end to the filter housing on the outer edge of its opening, each leg, if bent into its openings, being constructed to lie flat therein.

2. The structure of claim 1 in which each side portion is also connected to the filter housing adjacent its outer end.

References Cited in the file of this patent

UNITED STATES PATENTS

| | | |
|---|---|---|
| 2,316,527 | Mieras | Apr. 13, 1943 |
| 2,377,142 | Glanzer | May 29, 1945 |
| 2,582,915 | Sebok | Jan. 15, 1952 |
| 2,641,826 | Dreznes | June 16, 1953 |

FOREIGN PATENTS

| | | |
|---|---|---|
| 918,170 | France | Oct. 7, 1943 |
| 659,345 | Great Britain | Oct. 24, 1951 |